G. YANACOPOULOS.
POWER GENERATING SYSTEM.
APPLICATION FILED FEB. 20, 1919.
1,342,318.
Patented June 1, 1920.
2 SHEETS—SHEET 1.
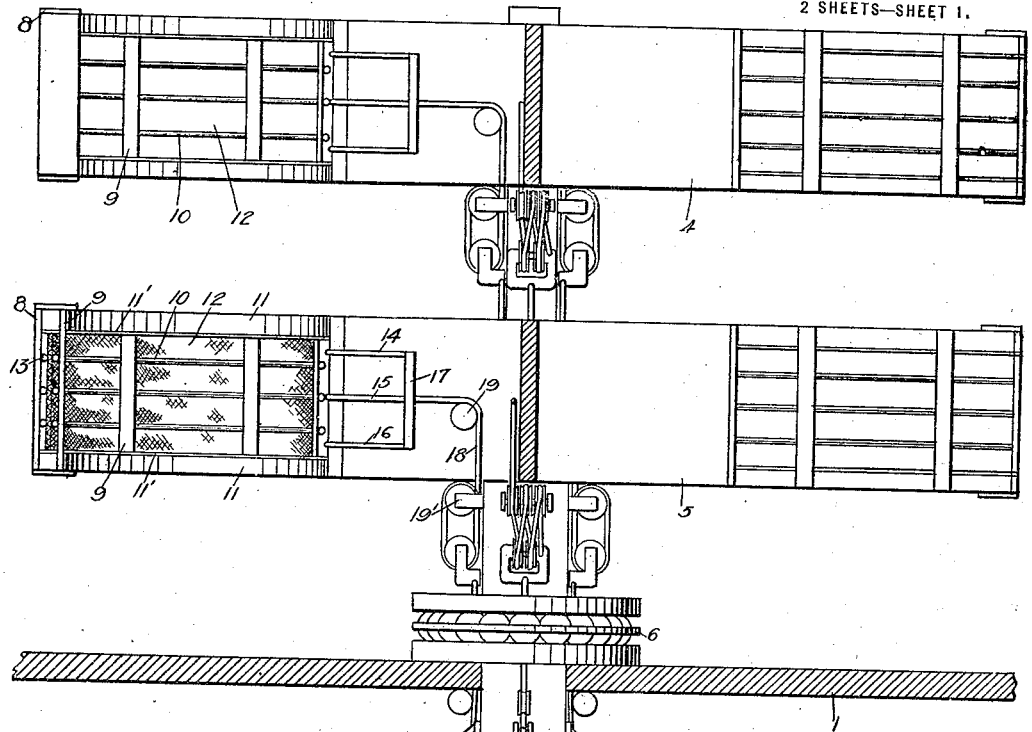
Fig.1.
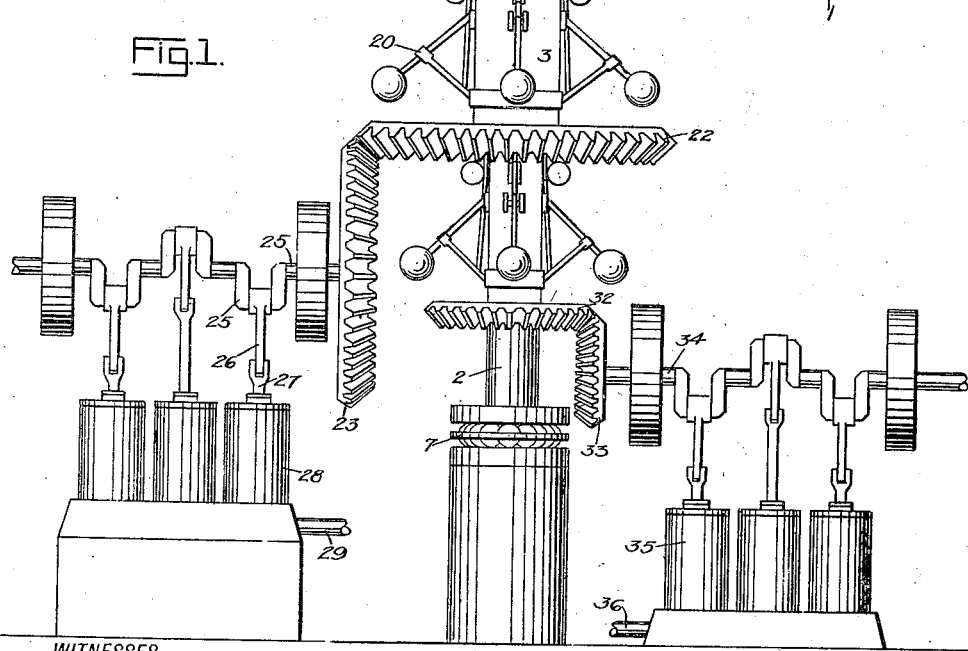
WITNESSES
C. Braw.
A. L. Kitchin.
INVENTOR
G. YANACOPOULOS
BY
ATTORNEYS

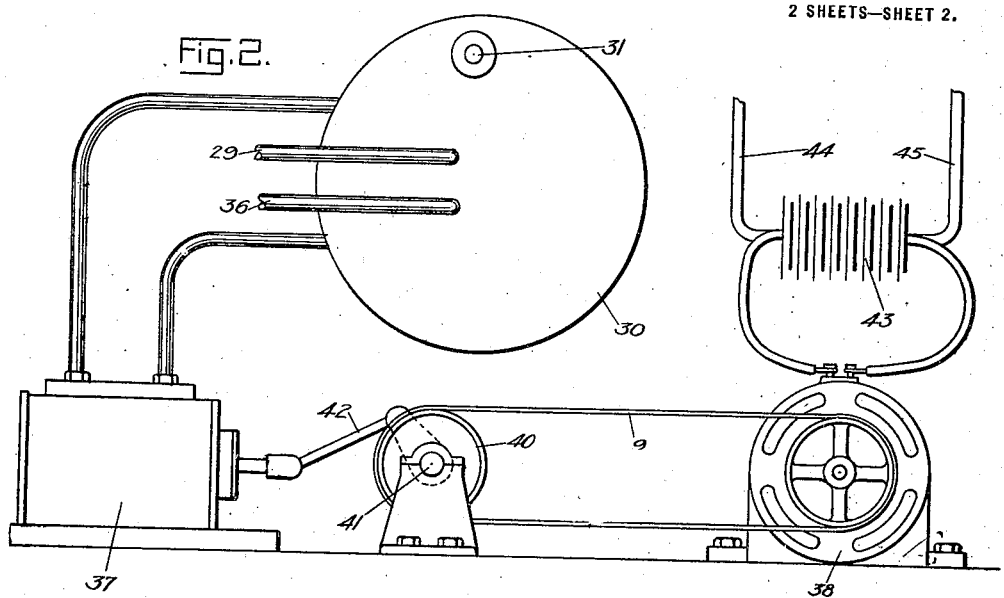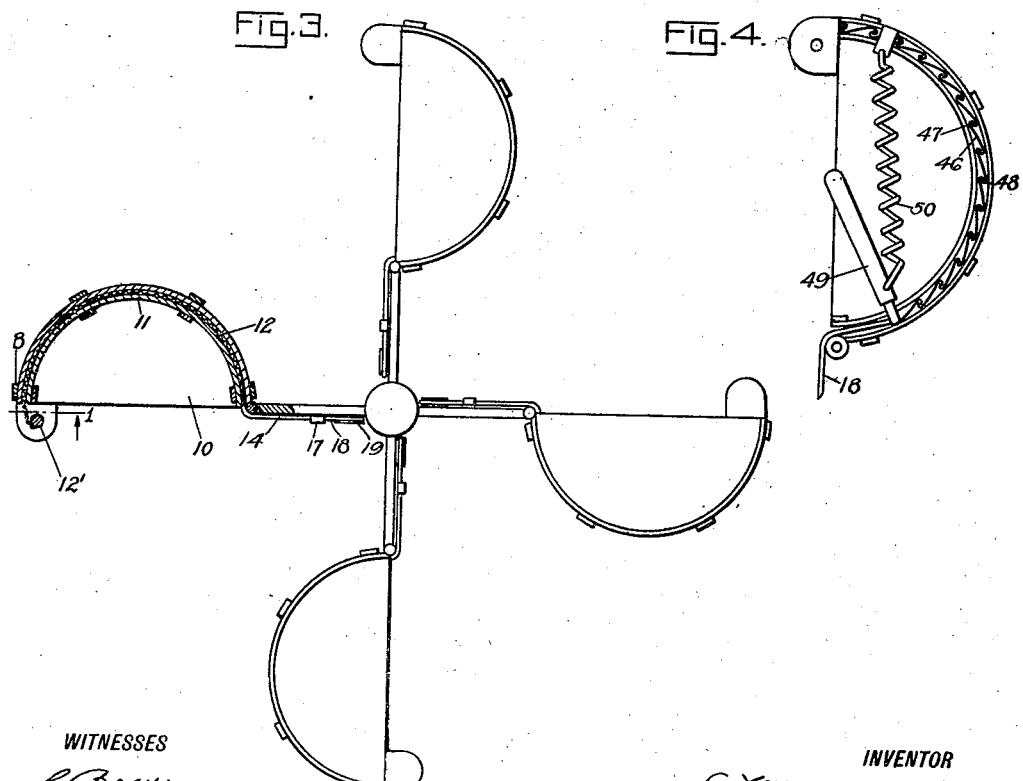

UNITED STATES PATENT OFFICE.

GEORGE YANACOPOULOS, OF NEW YORK, N. Y.

POWER-GENERATING SYSTEM.

1,342,318.　　　　　Specification of Letters Patent.　　Patented June 1, 1920.

Application filed February 20, 1919. Serial No. 278,152.

*To all whom it may concern:*

Be it known that I, GEORGE YANACOPOU-LOS, a citizen of the United States, and a resident of the city of New York, borough of Bronx, in the county of Bronx and State of New York, have invented a new and Improved Power-Generating System, of which the following is a full, clear, and exact description.

This invention relates to power generating systems and has for an object the provision of an improved construction wherein wind is utilized for compressing air to act as motive power for producing electrical current or for other purposes.

A further object of the invention is the provision of a windmill construction formed with superimposed blades and controlling means whereby the speed of the blades of the windmill may be varied automatically to stay within the limits of the pump or other apparatus connected thereto.

A still further object is to provide a system in which the air pressure is harnessed for operating pumps whereby compressed air in a large quantity may be secured for operating an air engine connected up to power producing machines, or machines of any desired kind.

A further object, more specifically, is the provision of a system whereby electrical energy may be produced and stored, the power necessary for the production of the electricity being secured through a system of related machines for converting the power of the wind into a driving member for the generating dynamo.

In the accompanying drawings:

Figure 1 shows a side view with certain parts in section of a windmill and certain other devices forming an embodiment of part of the invention.

Fig. 2 is a diagram showing an arrangement for utilizing the compressed air provided by the pumps disclosed in Fig. 1.

Fig. 3 is a top plan view of one set of blades shown in Fig. 1.

Fig. 4 is a fragmentary top plan view of one of the blades showing a slightly modified form of the invention to that disclosed in Fig. 3.

In embodying the invention in a full size operable device it is aimed to form the construction so that it may be used in any place. As shown in Fig. 1 of the drawing the device is formed so as to be positioned in the upper part of a building with the wind engaging structure above the roof. The building may support the device completely or where the device is very large additional braces may be provided without departing from the spirit of the invention.

Referring to the drawings by numerals 1 indicates a roof of a building through which a solid shaft 2 and a hollow shaft 3 extend. Connected with the shaft 2 is an upper windmill structure 4 and connected to the hollow shaft 3 is a windmill structure 5, said hollow shaft 3 and windmill structure 5 being supported by suitable thrust bearings 6. Thrust bearings 7 are provided for the shaft 2 and windmill 4. Any desired number of blades may be used for these windmills and they are preferably formed identical. For the purpose of illustration four blades have been shown in Fig. 3. Each of these blades is provided with a frame 8 and a curtain 12. The frame 8 consists of an outer and inner arrangement of bracing members, the inner arrangement being formed with two or more posts 9 for holding the arc-shaped guides 10 in position, while the outer arrangement consists of arc-shaped pieces of sheet material 11 at the top and bottom, and suitable guiding bars 13 between the members 11. This forms a guide for the curtain 12 which curtain is connected with a spring actuated roller 12' which tends to wind the curtain whenever possible. The free end of the curtain is connected by suitable cables 14, 15 and 16 to cross bar 17 to which an operating cable 18 is secured, said operating cable passing over pulley 19, multiplying mechanism 19' and thence to the governor 20. By this arrangement, the various blades of the windmill are open between the sections or members 11 so that when the curtain is wound on roller 12' the air may pass therethrough and consequently will not act on the blades of the windmill to any extent, the only action being against the members 11 adjacent the division plates 11'. When the windmill is beginning to move at too great a speed under the action of the air the governor 20 will act so as to release the cable 18 whereupon the spring actuated roller 12' will pull the curtain 12 to a certain extent as allowed by the action of the governor and thereby permit some of the air to pass through the openings between the various bars 10. This will reduce the pressure on the various blades and consequently the speed of the windmill. As the speed of the air increases the governor will move more and more and consequently the curtain 12 will be withdrawn more and more from covering the space between the bars 10 whereby the speed of the windmill is automatically maintained within certain limits.

The multiplying mechanism 19' may be of any desired kind, as for instance a system of pulleys well known in other arts, and the governor 20 may be also of any desired kind, as for instance the ordinary governor now in common use in connection with a steam engine. As the parts are set the action of the governor in speeding up will allow the spring actuated roller 12' to move the curtain out of the way, but it will be evident that the parts could be reversed so that as the windmill increases in speed the governor will act to pull the curtain from its position in front of the bars 10 without departing from the spirit of the invention.

It will be noted that there is one cable 18 and associate parts for each of the blades of the windmill, and that all these parts are identical in construction and are operated simultaneously. It will also be noted that the windmill 4 is identical in construction with windmill 5 and operates in a similar manner except that it is connected to the shaft 2 which extends through shaft 3. Shaft 2 at the lower end has a thrust bearing 7 for assisting to hold the windmill in proper place.

In order to transmit power from the shaft 3 a beveled gear 22 is rigidly secured thereto, which meshes with a second beveled gear 23 secured to the shaft 24, which shaft is provided with a number of crank members 25, each of which operates a connecting rod 26 pivotally connected with a piston rod 27. The respective piston rods 27 are connected to suitable pistons in the cylinders 28, each cylinder being provided with suitable valves whereby a complete air pump structure is presented. The pumps will draw air from the atmosphere and compress the same into pipe 29, which pipe is connected to a storage tank 30 as shown in Fig. 2. This storage tank 30 has a regulating safety valve 31 whereby it will receive air until a certain pressure has been obtained whereby the additional air will pass out as fast as the pumps force it in. The power is transmitted from the wind-mill 4 through shaft 2 to gear wheel 32 which meshes with the gear wheel 33, said gear wheel being rigidly secured to the crank shaft 34 which is operatively connected with the various pumps 35, which pump air through the pipe 36 to the container or tank 30. By reason of the release or safety valve 31 the pumps operated by either windmill may pump air slowly or at a high speed into the tank, but none of the parts will be injured and ample compressed air will be provided at all times for operating the air engine 37 which may be of any kind and which receives the air from the tank 30 through suitable connecting pipes. The engine 37 may be connected directly to a dynamo 38 or may be connected through a belt 39 and pulley 40 operated by a crank shaft 41, which is connected to the engine 30 through the connecting rod 42. The dynamo or generator 38 generates current at any desired voltage and the voltage is maintained the same in the usual manner, as the engine 37 is always supplied with uniform air pressure whether the pumps 38 or 35 are operating fast or slow.

A storage battery 43 is connected with dynamo 38 while from the storage battery and from the generator busbars or feed wires 44 and 45 extend to any desired point. When current is being used it will flow from the generator on to the busbars 44 and 45 and any excess current will flow into the storage batteries 43. By this construction and arrangement an ample supply of energy is provided at all times in the storage batteries 43 which energy is thus provided through the use of air on the windmills 4 and 5. If the windmills 4 and 5 were connected directly with the dynamo the variation in speed thereof would prevent a proper action of the dynamo, whereas, if the pumps 28 and 29 were connected directly to the engine 37 the same objection would be raised, namely that too much air or too little air would be provided. However, the use of the tank 30 and the pumping of the air so as to provide a continuous pressure for the engine 37 presents a construction which will allow the generator 38 to be moved at a constant speed, which is necessary for machines of this kind.

To assist in better regulating the action of the windmills on the pumps the shades and rollers 12' are provided and the automatic means for moving the same in one direction and releasing the same so that the springs on the rollers 12' will return the shades to their former position in the rounded end of the respective blades of the windmill. This arrangement of control and blade is desirable as it allows a certain amount of variation in speed and a constant wind pressure, but it will be evident that other forms of windmills and blades may be utilized without departing from the spirit of the invention.

In Fig. 4 will be seen a slightly modified arrangement of blade in which instead of having a flexible curtain sheet metal or other stiff members 46 are provided. These members are formed with hook ends 47 and 48 which interlock whereby when the cable 18 is released somewhat the lever 49 connected to the end member 46 is moved under the action of spring 50 and the members 46 are collapsed to a certain extent so as to allow a certain portion of the air striking the blade to pass through the blade. If the cable 18 is released to a further extent spring 50 will continue to move the members 46 until they are completely out of the way, if a sufficient movement of the cable 18 is provided.

The invention has been described more particularly for erecting the same in a field or on the top of a building, but it will be evident that it may be used on boats or vessels of any kind, either for propelling means or merely for supplying power for lighting and pumping out water. It is also evident that one or a number of engines may be used either separately or together and that when only a small supply of compressed air is provided one engine may be utilized at full capacity, while a large supply of air will permit one or several to be used at full capacity. In addition it will be noted that the drawings show two windmills super-imposed, but a greater number may be utilized without departing from the spirit of the invention, and that the supporting shafts would be arranged accordingly. Where one is used the shaft may be either solid or tubular.

What I claim is:

1. A mechanism of the character described, comprising a wind wheel formed with a plurality of blades, each of said blades being arc-shaped, and comprising concentric skeleton frames spaced apart, spring rollers carried by the blades, flexible sheets secured at one end to the rollers, wound thereon, and positioned between the concentric skeleton frames controlling the action of the rollers.

2. A mechanism of the character described, comprising a wind wheel formed with a plurality of blades, each of said blades being arc-shaped, and comprising concentric skeleton frames spaced apart, spring rollers carried by the blades, flexible sheets secured at one end to the rollers, wound thereon, and positioned between the concentric skeleton frames, and a centrifugal governor operated by the wind wheel and controlling the action of the rollers.

3. A mechanism of the character described, comprising a wind wheel formed with a plurality of blades, each of said blades being arc-shaped merging into turned over ends, a roller journaled in one of said ends, a flexible sheet member normally rolled on said roller, a spring for normally holding the roller in a given position and moving the same to position when released, and means for pulling said sheet across in front of the arc-shaped blades for varying the action of the air on the blades.

GEORGE YANACOPOULOS